(12) United States Patent
Isenmann et al.

(10) Patent No.: US 11,940,313 B2
(45) Date of Patent: Mar. 26, 2024

(54) FILL LEVEL SENSOR WITH POWER LIMITATION

(71) Applicant: VEGA Grieshaber KG, Wolfach (DE)

(72) Inventors: Marius Isenmann, Zell am Harmersbach (DE); Karl Griessbaum, Muehlenbach (DE)

(73) Assignee: VEGA Grieshaber KG, Wolfach (DE)

( * ) Notice: Subject to any disclaimer, the term of this patent is extended or adjusted under 35 U.S.C. 154(b) by 652 days.

(21) Appl. No.: 17/113,986

(22) Filed: Dec. 7, 2020

(65) Prior Publication Data
US 2021/0190570 A1 Jun. 24, 2021

(30) Foreign Application Priority Data
Dec. 20, 2019 (DE) .................. 10 2019 220 414.7

(51) Int. Cl.
*G01F 23/284* (2006.01)
*G01D 21/02* (2006.01)
*H02H 9/00* (2006.01)

(52) U.S. Cl.
CPC .......... *G01F 23/284* (2013.01); *G01D 21/02* (2013.01); *H02H 9/005* (2013.01)

(58) Field of Classification Search
CPC ...... G01D 21/00; G01D 21/02; G01F 23/284; H02H 9/005; H02H 9/008
See application file for complete search history.

(56) References Cited

U.S. PATENT DOCUMENTS

| | | | |
|---|---|---|---|
| 10,424,930 B2 | 9/2019 | Kech et al. | |
| 11,183,756 B1* | 11/2021 | Pond | H04W 52/04 |
| 2005/0195542 A1* | 9/2005 | Kimura | H02M 3/07 361/90 |
| 2009/0303648 A1* | 12/2009 | Benton | H02H 9/002 361/91.1 |
| 2013/0057425 A1* | 3/2013 | Wenger | H03K 5/133 342/124 |
| 2020/0241085 A1* | 7/2020 | Peev | G01D 3/08 |
| 2022/0155129 A1* | 5/2022 | Nilsson | G01F 23/284 |

FOREIGN PATENT DOCUMENTS

| | | |
|---|---|---|
| DE | 20023865 U1 | 12/2006 |
| DE | 102008054914 A1 | 6/2010 |
| DE | 102015225297 A1 | 6/2017 |

OTHER PUBLICATIONS

DE Search Report issued in DE Application No. 10 2019 220 414.7, dated Dec. 20, 2019, 9 pages.
Office Action issued in German Application No. 10 2019 220 414.7, dated Mar. 16, 2021, 9 pages.
Federal Ministry of Justice and Consumer Protection and the Federal Office of Justice; "Electromagnetic Compatibility Act" of Dec. 14, 2016 (BGBI. I p. 2879), as amended by Article 3 para. 1 of the Act of Jun. 27, 2017 (Federal Law Gazette I p. 1947) has been amended; Date of issue: Dec. 14, 2016; Law on the electromagnetic compatibility of Equipment (Electromagnetic Compatibility Act—EMVG) pp. 1-41.

* cited by examiner

*Primary Examiner* — Timothy X Pham
(74) *Attorney, Agent, or Firm* — Sterne, Kessler, Goldstein & Fox P.L.L.C.

(57) ABSTRACT

A measuring device is provided. The measuring device includes a sensor unit configured to detect a measurement signal, upstream measuring device electronics that include a signal processing circuit and an input interface, and a power limitation circuit arranged to limit the power supplied by the external power supply at the input interface.

7 Claims, 1 Drawing Sheet

FILL LEVEL SENSOR WITH POWER LIMITATION

CROSS-REFERENCE TO RELATED APPLICATIONS

The present application claims priority of German Patent Application No. 10 2019 220 414.7, filed on Dec. 20, 2019. The disclosed content of the German application is hereby entirely incorporated into the present disclosure by reference thereto.

FIELD OF THE INVENTION

The present invention relates to measuring apparatus technology. In particular, the invention relates to a measuring device for detecting a process variable in an industrial environment, several uses of the measuring device and the measuring device electronics of the measuring device.

BACKGROUND

The sensor units of measuring devices, especially of level sensors, require a certain amount of energy per measurement run to measure an unknown measured value, such as a level. For this purpose, an external energy supply is usually provided to supply the required energy.

If the measuring device is to be used in potentially explosive atmospheres, a so-called explosion protection may be provided to prevent sparks and the like. In particular, the explosion protection may ensure that excessive power peaks cannot occur in certain areas.

BRIEF SUMMARY

There may be a desire to provide an alternative measuring device.

This desire is met by the features of the independent claims. Further developments are stated in the dependent claims and the following description of embodiments.

A first aspect of the present disclosure relates to a measuring device, configured to measure a process variable, especially in the industrial environment in the field of process automation. However, the measuring device may also be used in other areas, but, according to one embodiment, it is set up and designed especially for industrial applications.

The measuring device has a sensor unit which is configured to detect a measuring signal which corresponds, for example, to a pressure, a level, a limit level, or a flow rate. For example, the measuring device is a radar level gauge which emits free-radiating or guided radar signals in the direction of a product surface.

Measuring device electronics with one or more circuit parts are connected ahead of the sensor unit. In particular, the electronic measuring device has a power supply and signal-processing circuit which is configured to evaluate the measuring signal detected by the sensor unit in order to determine, for example, the level, flow rate or pressure.

The measuring device electronics have an input interface, configured to connect the measuring device to an external power supply, for example a 4 to 20 mA two-wire cable. The power limitation circuit is configured to limit the power provided by the external power supply at the input interface, the power limitation circuit being located between the input interface and the signal processing circuit. The power limiting circuit can be configured in such a way that no further current limitation in the measuring device is necessary. Nevertheless, a further current limiting may be provided.

The terms power limiting circuit, signal processing circuit and sensor unit are to be interpreted broadly.

According to one embodiment, the power limitation circuit is configured to limit the power consumed to a maximum permissible power for fire or explosion protection. In particular, the measuring device can fulfil the corresponding fire and/or explosion protection conditions.

According to another embodiment of the present disclosure, the signal processing circuit comprises a power supply unit and an energy storage device connected to it, which is arranged to supply or "co-supply" (i.e. in addition to the power provided by the external power supply) the sensor unit with a peak power which is higher than the absorbed power, which is limited by the power limiting circuit. Alternatively or in addition, the signal processing circuit may be supplied by the energy storage for a short time.

According to another embodiment, the measuring device has no power limiting circuit between the power supply and signal processing circuit and the sensor unit. In particular, it may be provided that only a single power limiting circuit is provided, directly at the output of the measuring device, between the input interface and the signal processing circuit.

According to another embodiment, the measuring device is a level gauge, especially a radar level gauge, a level limit gauge, a flow meter or a pressure gauge.

Another aspect of the present disclosure relates to the use of a measuring device described above and below for level measurement, pressure measurement, flow measurement or limit level measurement.

According to another aspect of the present disclosure, the use of an electronic measuring device described above with a power supply and signal processing circuit in a measuring device is provided, whereby the electronic measuring device is configured to evaluate the measurement signal detected by the sensor unit of the measuring device. The measuring device electronics have an input interface, configured for connecting the measuring device to an external power supply. A power limitation circuit is provided, arranged to limit the power provided by the external power supply at the input interface, in particular for explosion protection, the power limitation circuit being arranged between the input interface and the power supply and signal processing circuit.

In the following, further embodiments of the present disclosure are described with reference to the figures. The representations in the figures are schematic and not to scale.

DETAILED DESCRIPTION

Figure 1:
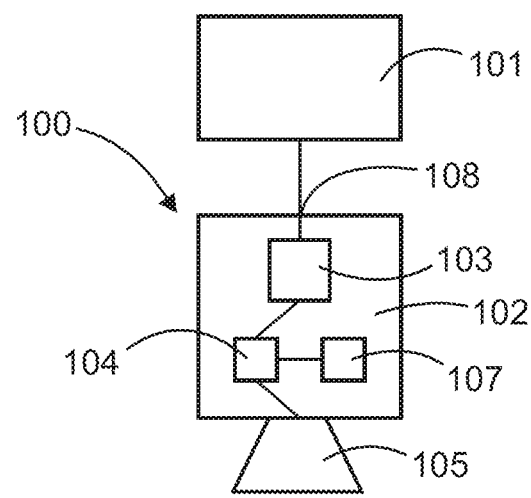
FIG. 1 shows a measuring device according to an embodiment.

FIG. 1 shows a measuring device 100 according to an embodiment. The measuring device is, for example, a level gauge, such as a level radar, a level limit gauge, a pressure gauge or a flow meter.

The measuring device 100 has a sensor unit 105, for example in the form of an antenna and associated high-frequency circuit, set up to detect a measurement signal. This is preceded by the measuring device electronics 102, which can be located inside a housing, for example. The measuring device electronics 102 have a power supply and signal processing circuit 104, which is arranged between an energy buffer memory 107 and a power limitation circuit 103 as well as the sensor unit 105. The power supply and signal processing circuit 104 may in particular have a microprocessor for signal processing and a power supply unit.

An input interface 108 is provided at the measurement housing, via which the power limitation circuit 103 can be connected to an external power supply 101.

The sensor unit of a level sensor generally requires a certain amount of energy to measure an unknown level. In case of an increased energy requirement which cannot be covered by the external power supply 101, an internal energy storage 107 is provided, which can also be called buffer storage. It can collect the power available at the input interface 108 for a certain time and make all the energy collected available during the shorter measurement. The available input power is limited, for example due to the use of a 4 to 20 mA two-wire interface and/or due to the use of the power limitation circuit 103.

The measuring device 100 is connected to the external power supply 101. Depending on the data transmission, the measuring signal can be transmitted simultaneously via the supply line. However, this signal can also be output via a separate interface.

The power supply 101 provides the measuring device 100 with the necessary energy. The measuring device has a sensor unit 105 and the associated circuit components 102.

In the sensor unit 105, a measuring signal is generated which is converted and processed by the other circuit components into an output measuring signal, in this case for example a level. A possible sensor unit is, for example, a radar unit.

The sensor unit 105 of level sensors is typically located in the immediate vicinity of the product to be measured. The measurement of the sensor unit is carried out at certain time intervals.

During a measurement of the fill level or another physical quantity, the sensor unit requires a certain peak power. The continuous power consumption may have to be limited due to the close proximity to the product. This can be prescribed by a set of regulations (for example, a standard).

Reasons for limiting the continuous power may be, for example, fire or explosion protection.

The continuous power is the average power that flows into the sensor unit over time. The peak power is the short-term power consumption of the sensor unit. Often, however, sensor units require a higher peak power than permitted by the regulations, but only for a limited time.

In front of the sensor unit 105 is a power supply unit with signal processing circuit 104 and an energy storage unit 107 connected to it.

In this case, the input power into the measuring device 100 is limited by means of the electronic power limitation circuit 103 as far as the continuous power into the sensor system permitted by the regulations allows.

The continuous power into the sensor unit 105 is thus less than or equal to the limited input power by the electronic power limitation circuit 103.

The connected buffer storage (energy storage 107) enables the power supply unit to provide the sensor unit 105 with a higher peak power for a short time by means of signal processing circuit 104.

Figure 2:
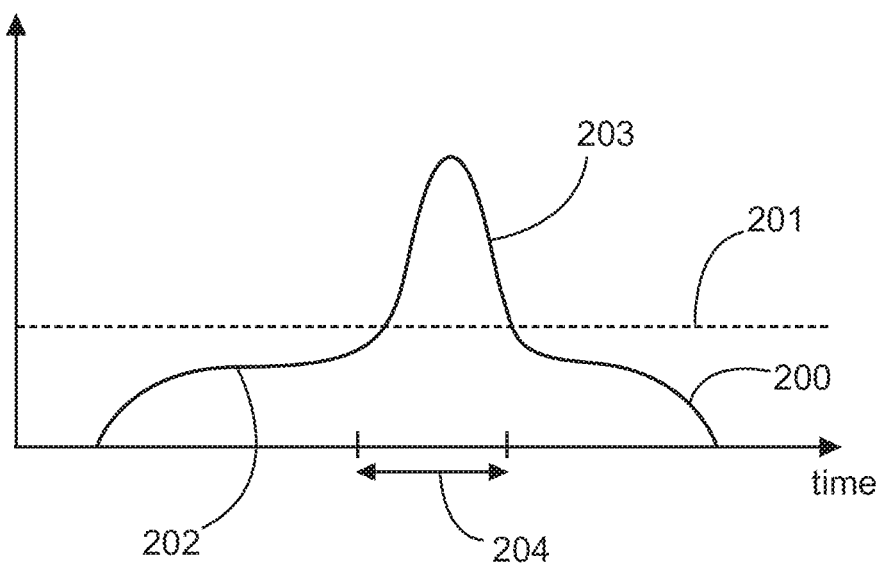
FIG. 2 shows the power consumption of the measuring device in FIG. 1 over time.

FIG. 2 shows an example of the energy or power consumption of such a measuring device over time. In further periods of time, the power requirement is below a critical threshold 201. The power limitation circuit 103 is set in such a way that this threshold 201 can never be exceeded by the external energy supply, even if the power requirement of the measuring device is temporarily higher. The power requirement 202 is initially well below the threshold 201, but then rises significantly during the measurement (cf. curve section 203), after which it drops below the threshold 201 again (cf. curve section 200).

During the period 204, the internal energy storage 107 is switched on to operate the peak power 203.

According to one embodiment, the signal processing circuit 104 may be configured to anticipate the power peak 202 and to connect the internal energy storage 107 early enough so that there is no power deficit within the meter circuit that could lead to an incorrect measured value or to any other malfunction of the meter.

In the periods outside the interval 204, the energy storage device 107 can be charged, since sufficient excess power can be made available.

In particular, there is no need for a power limitation between the power supply unit or the signal processing unit 104 and the sensor unit 105. In particular, it is possible to limit the continuous power to the maximum permissible power while providing enough power for the actual measurement.

The continuous power input of the measurement device is limited directly at its input interface. The available energy may be buffered and transferred to the sensor system in the form of short-term higher peak power.

The electronic power limitation limits the electrical input power (for example for safety reasons) to a preset threshold value for continuous power. In cases where a higher power is required for a short time, a buffer storage (energy storage 107) is provided, through which a higher peak power can be made available for a short time to supply the sensor unit. However, the threshold value of the average power consumption is not exceeded.

In addition, it should be noted that "comprising" and "having" do not exclude other elements or steps and the indefinite articles "a" or "an" do not exclude a plurality. It should also be noted that features or steps described by reference to one of the above embodiments may also be used in combination with other features or steps of other embodiments described above. Reference signs in the claims are not to be considered as limitations.

What is claimed is:

1. A measuring device configured to measure a process variable in an industrial environment in process automation, the measuring device comprising:
    a sensor unit configured to detect a measurement signal;
    upstream measuring device electronics with a signal processing circuit configured to evaluate the measurement signal detected by the sensor unit, wherein the measuring device electronics comprise an input interface configured to connect the measuring device to an external power supply;
    an internal energy storage; and
    a power limiting circuit arranged to limit a power supplied by the external power supply at the input interface, wherein the power limiting circuit is arranged between the input interface and the signal processing circuit,
    wherein the signal processing circuit comprises a power supply unit connected to the internal energy storage device, wherein the power supply unit is configured to supply additional power from the internal energy storage when a peak power required by the sensor unit or signal processing circuit is higher than a critical threshold.

2. The measuring device according to claim 1, wherein the power limiting circuit is configured to limit the power to a maximum permissible power for fire or explosion protection.

3. The measuring device according to claim 1, wherein the signal processing circuit with the power supply unit is arranged between the energy storage device and the power limiting circuit.

4. The measuring device according to claim 1, wherein no power limiting circuit is disposed between the signal processing circuit and the sensor unit.

5. The measuring device according to claim 1, wherein the measuring device is at least one of a level measuring device, a radar level measuring device, a limit level measuring device, a flow measuring device, or a pressure measuring device.

6. A method of controlling the measuring device according to claim 1 for at least one of level measurement, pressure measurement, flow measurement or limit level measurement.

7. A method of controlling measuring device electronics with a signal processing circuit in a measuring device, wherein the measuring device electronics are configured to evaluate a measurement signal detected by a sensor unit of the measuring device, and wherein the measuring device electronics comprise:

an input interface configured to connect the measuring device to an external power supply;

an internal energy storage; and a power limiting circuit configured to limit a power supplied by the external power supply at the input interface, wherein the power limiting circuit is located between the input interface and the signal processing circuit, wherein the signal processing circuit comprises a power supply unit connected to the internal energy storage device, wherein the power supply unit is configured to supply additional power from the internal energy storage when a peak power required by the sensor unit or signal processing circuit is higher than a critical threshold.

* * * * *

UNITED STATES PATENT AND TRADEMARK OFFICE
CERTIFICATE OF CORRECTION

PATENT NO. : 11,940,313 B2
APPLICATION NO. : 17/113986
DATED : March 26, 2024
INVENTOR(S) : Isenmann et al.

It is certified that error appears in the above-identified patent and that said Letters Patent is hereby corrected as shown below:

In the Claims

In Column 5, Claim 6, Line 18, delete "measurement" and insert -- measurement, --, therefor.

Signed and Sealed this
Eleventh Day of June, 2024

Katherine Kelly Vidal
*Director of the United States Patent and Trademark Office*